(12) United States Patent
Otani (10) Patent No.: US 11,314,236 B2
(45) Date of Patent: Apr. 26, 2022

(54) PLANT EQUIPMENT MONITORING CONTROL SYSTEM AND PLANT EQUIPMENT MONITORING CONTROL METHOD

(71) Applicant: MITSUBISHI POWER ENVIRONMENTAL SOLUTIONS, LTD., Yokohama (JP)

(72) Inventor: Yuji Otani, Yokohama (JP)

(73) Assignee: MITSUBISHI HEAVY INDUSTRIES POWER ENVIRONMENTAL SOLUTIONS, LTD., Kanagawa (JP)

( * ) Notice: Subject to any disclaimer, the term of this patent is extended or adjusted under 35 U.S.C. 154(b) by 0 days.

(21) Appl. No.: 16/967,886

(22) PCT Filed: Jan. 18, 2019

(86) PCT No.: PCT/JP2019/001511
§ 371 (c)(1),
(2) Date: Aug. 6, 2020

(87) PCT Pub. No.: WO2019/159601
PCT Pub. Date: Aug. 22, 2019

(65) Prior Publication Data
US 2021/0055713 A1 Feb. 25, 2021

(30) Foreign Application Priority Data
Feb. 16, 2018 (JP) .............................. JP2018-025646

(51) Int. Cl.
*G05B 19/418* (2006.01)
(52) U.S. Cl.
CPC ... *G05B 19/41865* (2013.01); *G05B 19/4183* (2013.01); *G05B 19/4185* (2013.01); *G05B 19/41885* (2013.01)

(58) Field of Classification Search
CPC .......... G05B 19/41865; G05B 19/4183; G05B 19/4185; G05B 19/41885; G05B 13/0205;
(Continued)

(56) References Cited

U.S. PATENT DOCUMENTS 5,873,251 A 2/1999 Iino
8,738,326 B2 5/2014 Gurijala et al.
(Continued)

FOREIGN PATENT DOCUMENTS

JP 9-179604 A 7/1997
JP 2000-140689 A 5/2000
(Continued)

OTHER PUBLICATIONS

International Search Report dated Apr. 16, 2019, issued in counterpart International Application No. PCT/JP2019/001511 (1 page).
(Continued)

*Primary Examiner* — Christopher E. Everett
(74) *Attorney, Agent, or Firm* — WHDA, LLP (57) ABSTRACT

An objective of the present invention is to achieve optimal operating guidance on day-to-day operations in a plant while also achieving, for example, soundness and reduced operating costs for a plant equipment piece without increasing the load on the central operation room, by determining the optimal configuration value for the operating value of the plant equipment piece. To this end, there is provided an equipment state monitoring device 331 for analyzing an operating state of a first plant equipment piece 303 during a prescribed period. The equipment state monitoring device 331 analyzes the operating state of the first plant equipment piece 303, and depending on a result of the analysis, carries out determination of an optimal operating value.

11 Claims, 11 Drawing Sheets

(58) Field of Classification Search
CPC .. G05B 23/02; B03C 3/76; B03C 3/02; B03C 3/68
See application file for complete search history.

(56) References Cited

U.S. PATENT DOCUMENTS

| | | | |
|---|---|---|---|
| 2013/0212420 A1* | 8/2013 | Lawson | G05B 19/4185 713/400 |
| 2019/0064787 A1* | 2/2019 | Maturana | G05B 23/0294 |
| 2019/0339680 A1 | 11/2019 | Aota et al. | |

FOREIGN PATENT DOCUMENTS

| | | |
|---|---|---|
| JP | 2011-110440 A | 6/2011 |
| JP | 2012-71280 A | 4/2012 |
| JP | 2017-176922 A | 10/2017 |
| TW | 201804326 A | 2/2018 |

OTHER PUBLICATIONS

First Office Action dated Nov. 6, 2019, issued in counterpart TW Patent Application No. 108103437 w/English translation (15 pages).
Office Action dated Nov. 11, 2021, issued in counterpart IN Application No. No. 202017029993, with English translation. (6 pages).

* cited by examiner

| TIME | SENSOR MEASUREMENT VALUE 601 | | | ENVIRONMENT 602 | | DISTURBANCE 603 | | EQUIPMENT OPERATING VALUE 604 | | | | |
|---|---|---|---|---|---|---|---|---|---|---|---|---|
| | $b_1$ | ... | $b_n$ | TYPE OF COAL | BOILER LOAD | PURIFI-CATION | ... | CONTIN-UOUS | INTER-MITTENT | PULSE | HAMMER-ING INTERVAL | ROTA-TION SPEED |
| 2017.10.01_12 | $b_1A$ | ... | $b_nA$ | α | $x_1$ | OFF | ... | OFF | ON | OFF | $y_1$ | $z_1$ |
| 2017.10.01_13 | $b_1B$ | ... | $b_nB$ | α | $x_2$ | OFF | ... | OFF | ON | OFF | $y_2$ | $z_2$ |
| ... | ... | ... | ... | ... | ... | ... | ... | ... | ... | ... | ... | ... |
| 2017.10.05_17 | $b_1K$ | ... | $b_nK$ | α | $x_k$ | ON | ... | OFF | ON | OFF | $y_k$ | $z_k$ |
| ... | ... | ... | ... | ... | ... | ... | ... | ... | ... | ... | ... | ... |
| 2017.10.10_21 | $b_1Y$ | ... | $b_nY$ | β | $x_n$ | OFF | ... | ON | OFF | OFF | $y_n$ | $z_n$ |

PLANT EQUIPMENT MONITORING CONTROL SYSTEM AND PLANT EQUIPMENT MONITORING CONTROL METHOD

TECHNICAL FIELD

The present invention relates to a plant equipment monitoring control system and a plant equipment monitoring control method that monitor and control a plant equipment piece. More specifically, the present invention relates to the monitoring of an electrostatic precipitator that processes dust contained in exhaust gas from a plant.

BACKGROUND ART

For example, in a plant such as a thermal power plant and a steel manufacturing plant, the operating states of respective equipment pieces provided in the plant (referred to as "plant equipment piece") are monitored in a central operation room provided in a site. Since the respective plant equipment pieces are disposed in the wide site, measurement values from sensors provided on the respective equipment pieces are collected to the central operation room, and from these, the operator in the central operation room grasps the operating states of the respective equipment pieces to perform the necessary control. These measurement values include data related to the operating state of the plant (for example, the amount of introduction of a fuel, a material, and the like, the amount of electric generation, the amount of production, and the like), the operating parameter of each equipment piece (an electric current value, a voltage value, and the like fed to each equipment piece), and data of the concentration and the like of the regulated substance contained in exhaust gas, drainage, waste, and the like.

With the rising of the global environmental awareness, various environmental regulations for the exhaust gas, the drainage, the waste, and the like discharged from the plant are set in each country and area. For this, the plant is provided with an environmental conservation apparatus for removing the restricted substance contained in the exhaust gas, the drainage, the waste, and the like so that the restricted substance has a prescribed value or less. As one such environmental conservation apparatus, there is an electrostatic precipitator. The electrostatic precipitator is a device for collecting dust contained in the exhaust gas. As a known technique for achieving the optimization of the electrostatic precipitator, there is PTL 1. PTL 1 relates to a moving electrode type electrostatic precipitator, and discloses that as the moving speed of a collecting electrode plate is higher, dust can be prevented from being accumulated, whereas when the moving speed is high, the components wear significantly, resulting in shorter life, so that the electric charging state of an discharge electrode and the collecting electrode plate are determined in each cycle of the collecting electrode plate, and the moving speed of the collecting electrode plate is adjusted according to the electric charging state.

On the other hand, in PTL 2, by continuously remotely monitoring the measurement value from the sensor provided on the equipment piece, the performance characteristic of the equipment piece is analyzed, and is compared with the targeted performance characteristic. With this, the deterioration of the performance of the equipment piece can be grasped at the early stage.

CITATION LIST

Patent Literature

PTL 1: Japanese Patent Application Laid-Open No. 2000-140685
PTL 2: U.S. Pat. No. 8,738,326

SUMMARY OF INVENTION

Technical Problem

In the central operation room of the plant, a huge amount of data is collected from the sensors provided on the respective plant equipment pieces. On the other hand, in the plant in which labor saving is being advanced, a small number of operators are required to control the entire plant in the central operation room, and it is thus difficult to completely utilize a huge amount of the collected data. For example, in the case of the thermal power plant, the amount of electric generation is controlled according to the demand for electric power while the environmental regulations are observed, so that for the amount of introduction of the fuel and the like into the plant equipment pieces, such as a boiler and a turbine (these are referred to as "main equipment piece") and the amount of electric generation, or the amount of the regulated substance in the exhaust gas, the drainage, and the like discharged from the environmental conservation apparatus, these data pieces are monitored to perform the necessary control in real time according to the target value and the regulation value. On the contrary, for example, the control to optimize the operation of an auxiliary equipment piece (referred to as the plant equipment piece other than the main equipment piece) that is not directly related to the target value and the regulation value in the operation in the plant, as described in PTL 1, is not performed in the central operation room that manages the operation in the entire plant. Due to this, the configuration value set during the installation of the auxiliary equipment piece is used as it is, and the operating state of the auxiliary equipment piece is often checked substantially only in the periodic inspection performed on a yearly basis. In this case, there is a fear that the operation of the auxiliary equipment piece is continued in the state where the efficiency is lowered over a long period.

In PTL 1, the optimal control of the moving electrode is performed on the basis of the electric charging characteristic, but the number of factors that affect the performance of the electrostatic precipitator is large, and it is thus necessary to optimize the entire device by grasping the past operation tendency and the like, not to optimize the device by some components. Also, PTL 2 is to detect the abnormality of the equipment piece at the early stage, and does not disclose that the finding from the sensor measurement value and the like is reflected to the day-to-day operations of the equipment piece.

Solution to Problem

A plant equipment monitoring control system that is an aspect of the present invention has a plurality of plant equipment pieces including a first plant equipment piece, a plurality of monitoring control devices provided corresponding to the respective plurality of plant equipment pieces, a plurality of sensors provided on the plurality of plant equipment pieces, a monitoring device that collects sensor measurement values from the plurality of sensors of the plurality of plant equipment pieces, a central control device that continuously monitors each of the sensor measurement values collected to the monitoring device, and instructs an operating value in real time according to the sensor measurement value to the monitoring control device corresponding to each of the plant equipment pieces, and an equipment state monitoring device that receives first monitoring data including the sensor measurement value and the operating value from the monitoring device and the central control device, analyzes an operating state of the first plant equipment piece during a prescribed period, and carries out determination of an optimal operating value of the first plant equipment piece depending on a result of the analysis of the operating state of the first plant equipment piece.

Other objects and novel features will be apparent from the description herein and the accompanying drawings.

Advantageous Effects of Invention

Optimal operating guidance on day-to-day operations is achieved while for example, soundness and reduced operating costs for the plant equipment piece are also achieved without increasing the load on the central operation room, by determining the optimal configuration value for the operating value of the plant equipment piece, especially the auxiliary equipment piece.

DESCRIPTION OF EMBODIMENTS

Figure 1:
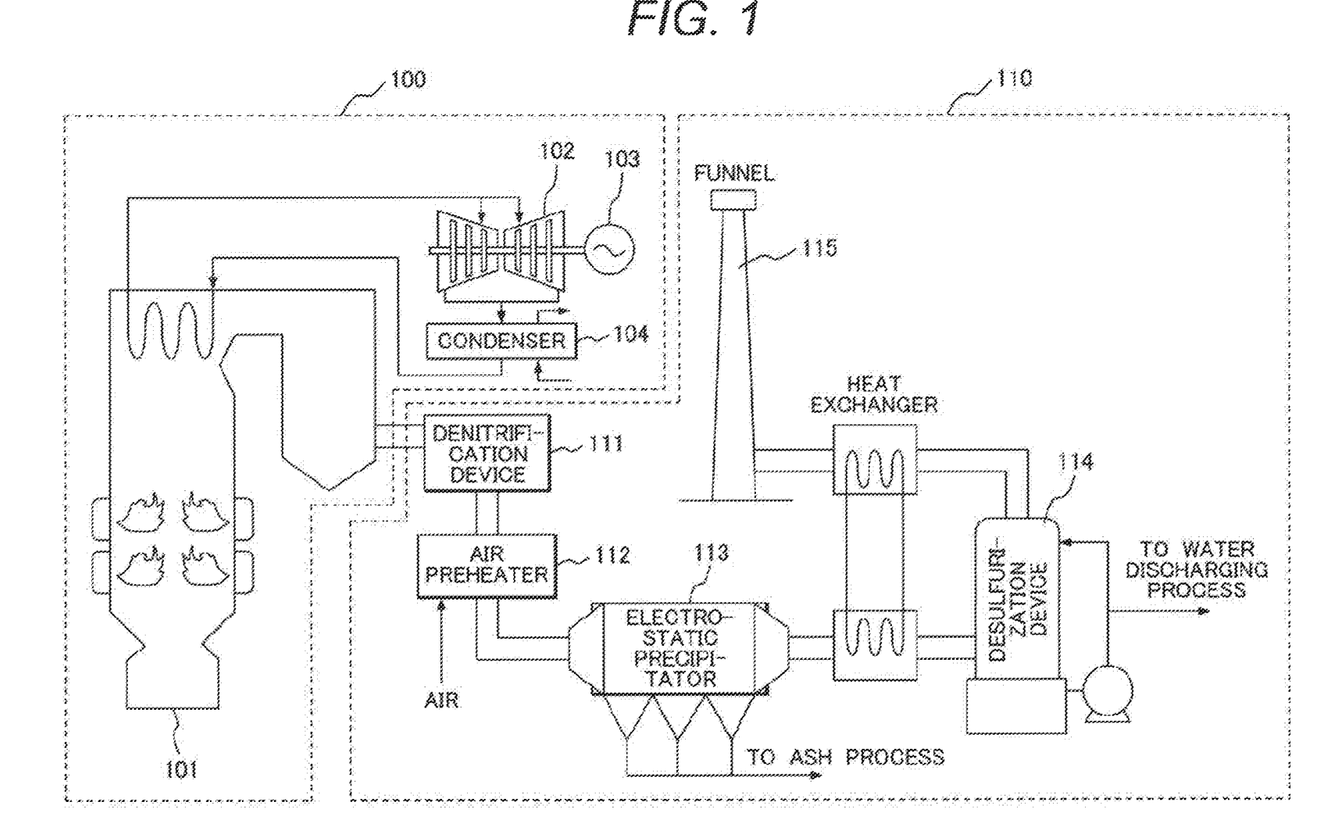
FIG. 1 is a configuration example of an environmental conservation apparatus of a thermal power plant.

FIG. 1 illustrates a configuration example of an environmental conservation apparatus of a thermal power plant that is an example of a plant. The reference numeral 100 denotes a device group corresponding to main equipment piece. A turbine 102 is rotated by steam generated by a boiler 101, and an electric generator 103 is rotated to generate electricity. The steam used to rotate the turbine 102 is introduced into a condenser 104 to be returned to water that is then supplied to the boiler 101 again. Since the boiler 101 converts the water to the steam by a fossil fuel, exhaust gas discharged from the boiler 101 contains various regulated substances. To remove these, an environmental conservation apparatus 110 is provided. Examples of the representative devices of the environmental conservation apparatus 110 include a denitrification device 111, an electrostatic precipitator 113, and a desulfurization device 114. The denitrification device 111 is a device for reducing a nitrogen oxide ($NO_x$) contained in the exhaust gas, and for example, there have been known a selective catalytic reduction denitrification technique in which ammonia ($NH_3$) is blown into the exhaust gas and the $NO_x$ is dissolved into nitrogen and water on the catalysis, and the like. The electrostatic precipitator 113 is a device for reducing dust particles contained in the exhaust gas, and this will be described later. The desulfurization device 114 is a device for reducing a sulfur oxide ($SO_x$) contained in the exhaust gas, and for example, there have been known a wet lime-gypsum method in which the exhaust gas and a limestone slurry are gas-liquid contacted, calcium (Ca) and sulfur dioxide gas ($SO_2$) are reacted to absorb the $SO_2$, and gypsum is recovered as a by-product, and the like.

Figure 2A:
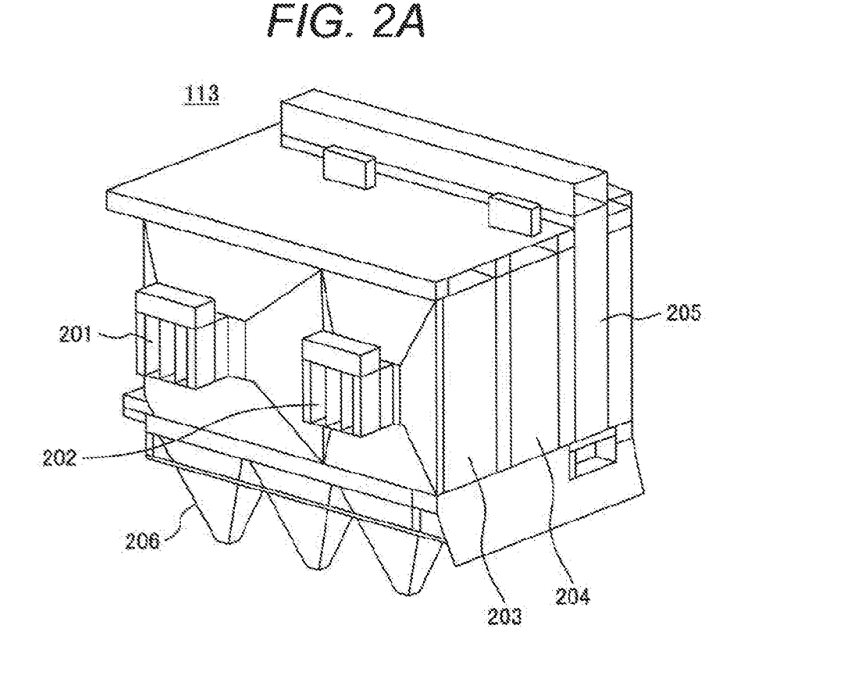
FIG. 2A is a schematic configuration diagram of an electrostatic precipitator.

FIG. 2A illustrates a schematic configuration diagram of the electrostatic precipitator 113. In the example of FIG. 2A, two flues 201 and 202 are provided, and while the exhaust gas introduced from each of the flues passes through the device, the dust contained in the exhaust gas are collected. Also, while passing through the electrostatic precipitator 113, the exhaust gas passes through three dust collection sections 203 to 205. In each of the dust collection sections, a collecting electrode that allows the dust to adhere thereto is disposed (see FIG. 2B described later). The dust that adhere to the collecting electrode and are accumulated on the collecting electrode are separated, and are collected into a hopper 206. It should be noted that the electrostatic precipitator 113 is designed according to the required dust collection performance, and the number of flues and the number of dust collection sections are set according thereto, and are not limited to a specific number of flues and a specific number of dust collection sections, respectively.

Figure 2B:
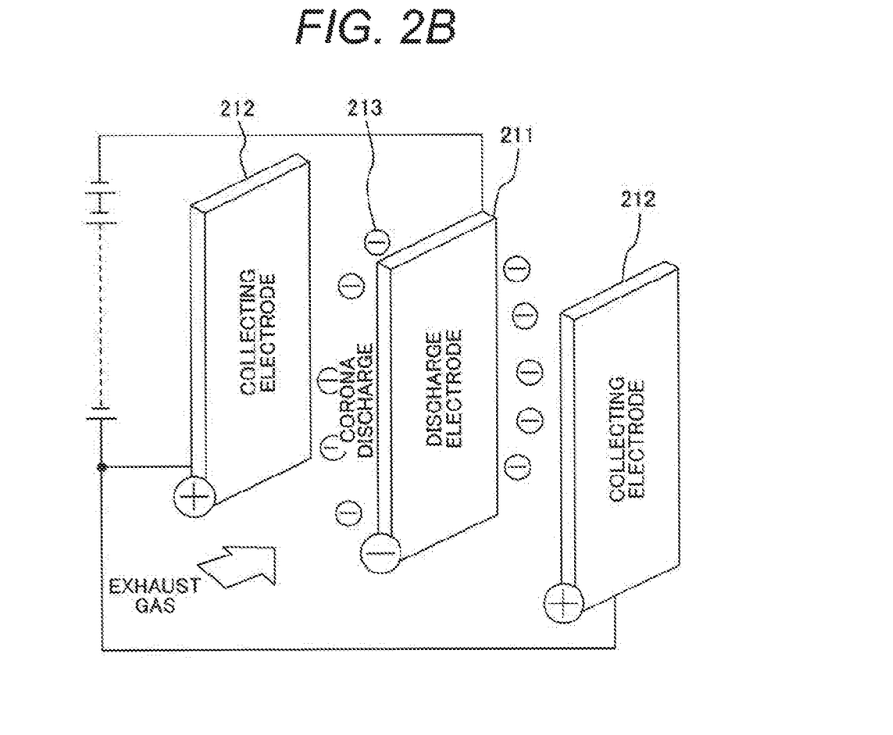
FIG. 2B is a diagram explaining the principle of the electrostatic precipitator.

The principle of the electrostatic precipitator will be described with reference to FIG. 2B. In the respective dust collection sections, a plurality of pairs of discharge electrodes 211 and collecting electrodes 212 illustrated in FIG. 2B are disposed, and the exhaust gas passes therebetween. During the operation of the electrostatic precipitator, a high voltage is applied to between the discharge electrode 211 and the collecting electrode 212 to generate corona discharge. With this, ions 213 are generated. The dust contained in the exhaust gas are electrically charged by the ions 213, are attracted to the collecting electrode 212 opposite the discharge electrode by the electrostatic attraction force, and adhere to the collecting electrode 212 to be accumulated on the collecting electrode 212, so that the dust contained in the exhaust gas are reduced. When the dust is continuously accumulated on the collecting electrode 212, the dust collection performance is lowered, and the accumulated dust is thus required to be separated from the collecting electrode 212. For this, there have been known devices of the methods, such as a fixed electrode type device in which the collecting electrode 212 is hammered to give vibration, thereby separating the accumulated dust, or a moving electrode type device in which the collecting electrode 212 is movable, and the collecting electrode is moved to brush off the accumulated dust with a brush. To the electrostatic precipitator 113, the device of one or both of the methods is applicable.

Example 1

Figure 3:
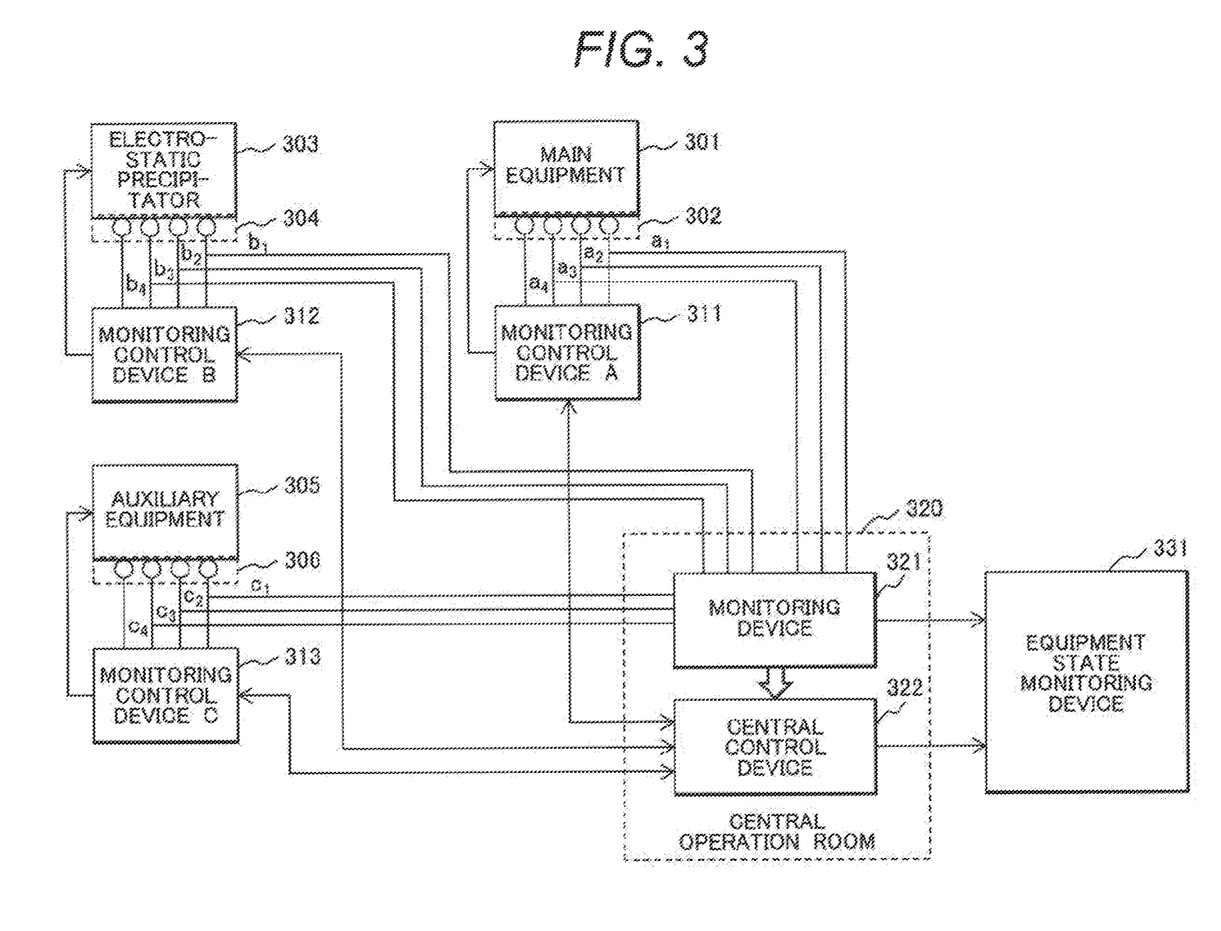
FIG. 3 is a configuration example of a plant equipment monitoring control system.

FIG. 3 illustrates a plant equipment monitoring control system according to Example 1. The plant equipment piece as illustrated in FIG. 1 is to be controlled, and in this example, main equipment piece 301, an electrostatic precipitator 303, and auxiliary equipment piece 305 are illustrated. These plant equipment pieces are respectively provided with a plurality of sensors 302, 304, and 306, and the measurement values of these sensors are inputted in real time to monitoring control devices 311, 312, and 313 that monitor and control the respective plant equipment pieces. Also, some of the sensor measurement values are inputted to a monitoring device 321 of a central operation room 320 in real time. In the central operation room 320, while continuously monitoring each of the sensor measurement values from each plant equipment piece collected to the monitoring device 321, a central control device 322 performs the control to each plant equipment piece according to the target value and the regulation value of the plant. The instruction from the central control device 322 is transmitted to the monitoring control device 311, 312, or 313 of each plant equipment piece, and each of the monitoring control devices executes the control of the plant equipment piece on the basis of the instruction of the central control device 322. The operating value to each plant equipment piece set by the monitoring control device 311, 312, or 313 is also grasped by the central control device 322.

The type and number of the sensors provided on the plant equipment piece are not particularly limited. The sensor is installed according to the item necessary for monitoring and controlling the equipment piece. Examples of the items measured by the sensor 304 provided on the electrostatic precipitator 303 include, for example, the electric charging current, the electric charging voltage, the number of times of sparking, and the like of the electrostatic precipitator.

The plant equipment monitoring control system of this example further has an equipment state monitoring device 331 that monitors the operating states of these plant equipment pieces. While the central operation room performs the equipment monitoring control for controlling the day-to-day operations in the plant equipment piece, the equipment state monitoring device 331 performs the analysis for determining an optimal operating value that achieves the improvement in the performance of the plant equipment piece, the maintenance of soundness, reduced operating costs, and the like. It should be noted that in FIG. 3, the equipment state monitoring device 331 is disposed outside of the central operation room 320, but may be provided inside of the central operation room 320, or on the contrary, may be provided outside of the site of the plant. The monitoring device 321, the central control device 322, and the equipment state monitoring device 331 are connected via the network, but the network may be a public telephone line or a dedicated telephone line.

Figure 4:
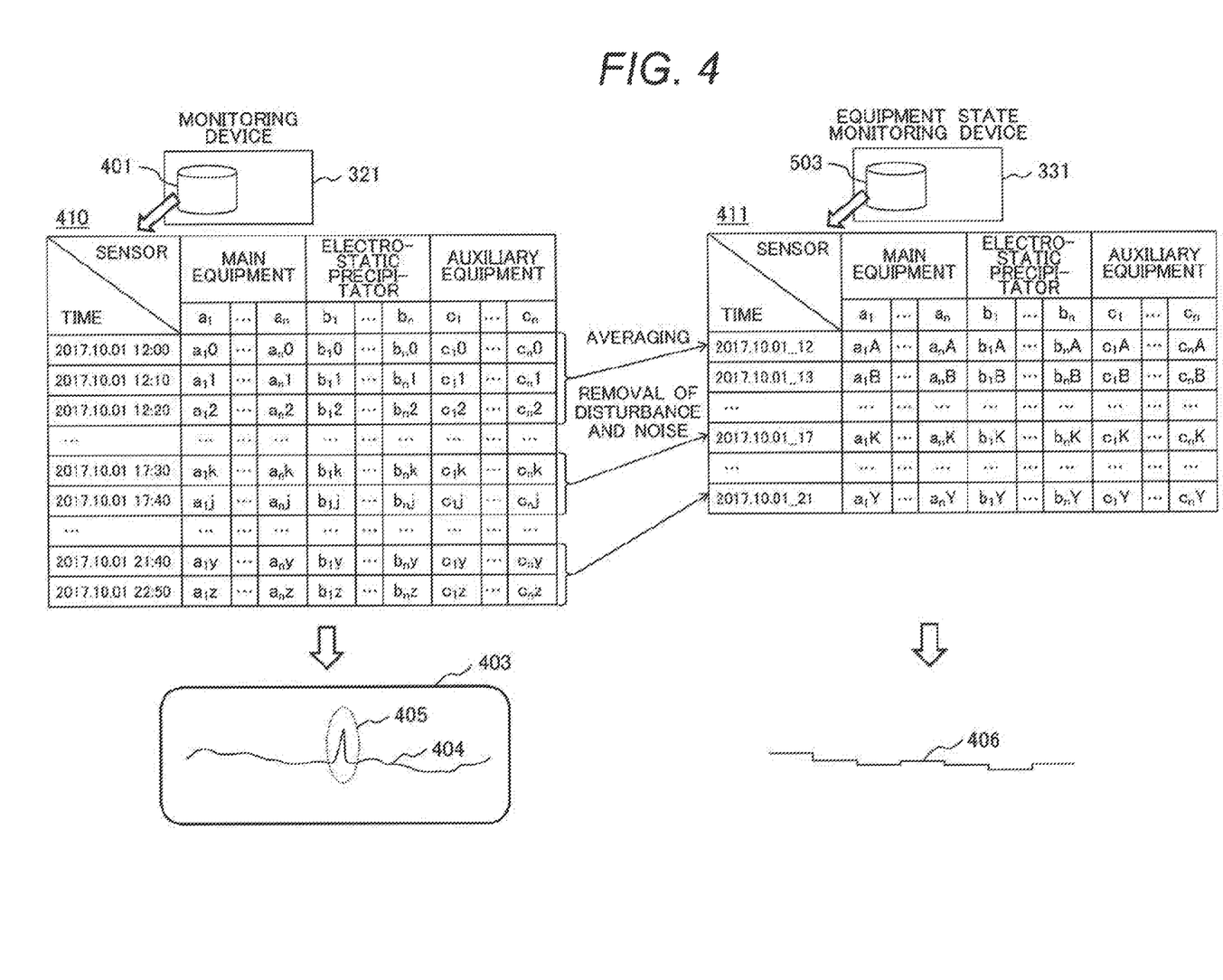
FIG. 4 is a diagram explaining the relationship between sensor measurement values used in a monitoring device and sensor measurement values used in an equipment state monitoring device.

The relationship between the sensor measurement values used in the monitoring device 321 and the sensor measurement values used in the equipment state monitoring device 331 will be described with reference to FIG. 4. In a storage device 401 of the monitoring device 321, the sensor measurement values collected from the respective plant equipment pieces are stacked. For example, the sensor measurement values are stacked in the form of monitoring data 410, and a set of the time at which each of the sensor measurement values reaches the monitoring device 321 and the sensor measurement value is stored. It should be noted that in the illustration of FIG. 4, for simplifying the description, all the sensor measurement values reach the monitoring device 321 at the same timing, but the sensor measurement values may reach the monitoring device 321 at the respective timings. The monitoring device 321 chronologically displays, as the index, the sensor measurement values related to the target value and the regulation value of the plant or data calculated from the sensor measurement values, from the monitoring data 410 on a monitor 403 of the monitoring device 321 (a waveform 404). While continuously monitoring the index, the operator in the central operation room 320 executes the necessary control in real time with respect to each plant equipment piece from the central control device 322.

On the ether hand, the equipment state monitoring device 331 monitors the state of the plant equipment piece on the basis of monitoring data 411 processed and created from the monitoring data 410, and performs the analysis for determining the optimal operating value of the plant equipment piece. For this, the monitoring data does not require the real time properties, and the tendency needs only to be found by discarding the fine change in the operating state. Thus, disturbance and noise caused during the day-to-day operations are removed from the monitoring data 410, and the monitoring data 411 is leveled by averaging the sensor measurement values during the prescribed time. For example, when a waveform 406 on the basis of the monitoring data 411 corresponding to the waveform 404 is created, disturbance 405 included in the waveform 404 is removed, and the fine change in the waveform 404 is uniformed and leveled. Also, for determining the optimal operating value of the operation of the plant equipment piece, the comparison of the operating data under the equivalent condition or the tendency grasped from the operating data stacked for a certain period or more is more important than the real time change. Due to this, the control in the equipment state monitoring device 331 is performed by a batch process. Thus, the control information, such as the sensor measurement value from the monitoring device 321 and the set operating value of each plant equipment piece from the central control device 322, may be transferred to the equipment state monitoring device 331 at the timing of, for example, once a day.

Hereinafter, with the electrostatic precipitator that is one of the auxiliary equipment pieces as an example, an example in which the optimal operating value of the electrostatic precipitator is determined by the plant equipment monitoring control system according to this example will be described. Examples of the items of the optimal operating value determination of the electrostatic precipitator include at least one of the following three.

(1) An Operation of Brushing Off the Dust

As illustrated in FIG. 2B, the dust is required to be separated at the stage where the dust is accumulated to some extent so that the dust is not excessively accumulated on the collecting electrode. On the other hand, when the dust is excessively brushed off, this can lead to the early wear and deterioration of the facility. Thus, the optimal configuration value of the collecting electrode hammering cycle, the discharge electrode hammering cycle, or the moving electrode rotation speed is determined.

(2) A Method for Electrically Charging the Electrode

The dust collection performance of the electrostatic precipitator is significantly affected by the properties of the dust. For example, it has been known that when much dust having a high electric resistivity is contained in the exhaust gas, a phenomenon in which positive ions are emitted from the collecting electrode by occurring dielectric breakdown in the dust layer accumulated on the collecting electrode (referred to as "reverse ionization") is likely to be caused, and in this case, the dust collection performance is significantly lowered. In such a case, by intermitting the electric charging of the electrode, the reverse ionization can be prevented from being caused. In this way, as for the method for electrically charging the electrode, it is determined which of the continuous electric charging, the intermittent electric charging (and the electric charging rate in this case), and the pulse electric charging provides the maximum performance (optimal operating value) according to the properties of the dust and the operating state of the plant.

(3) The Electric Power Consumption of an Electric Charging Device

The electric power consumption of an electric charging device that applies a negative voltage to between the discharge electrode and the collecting electrode is determined according to the electric current and voltage applied and the electric charging method. The optimal electric power consumption of the electric charging device is determined so that while the dust collection performance is maintained, the electric power consumption is reduced.

Figure 5:
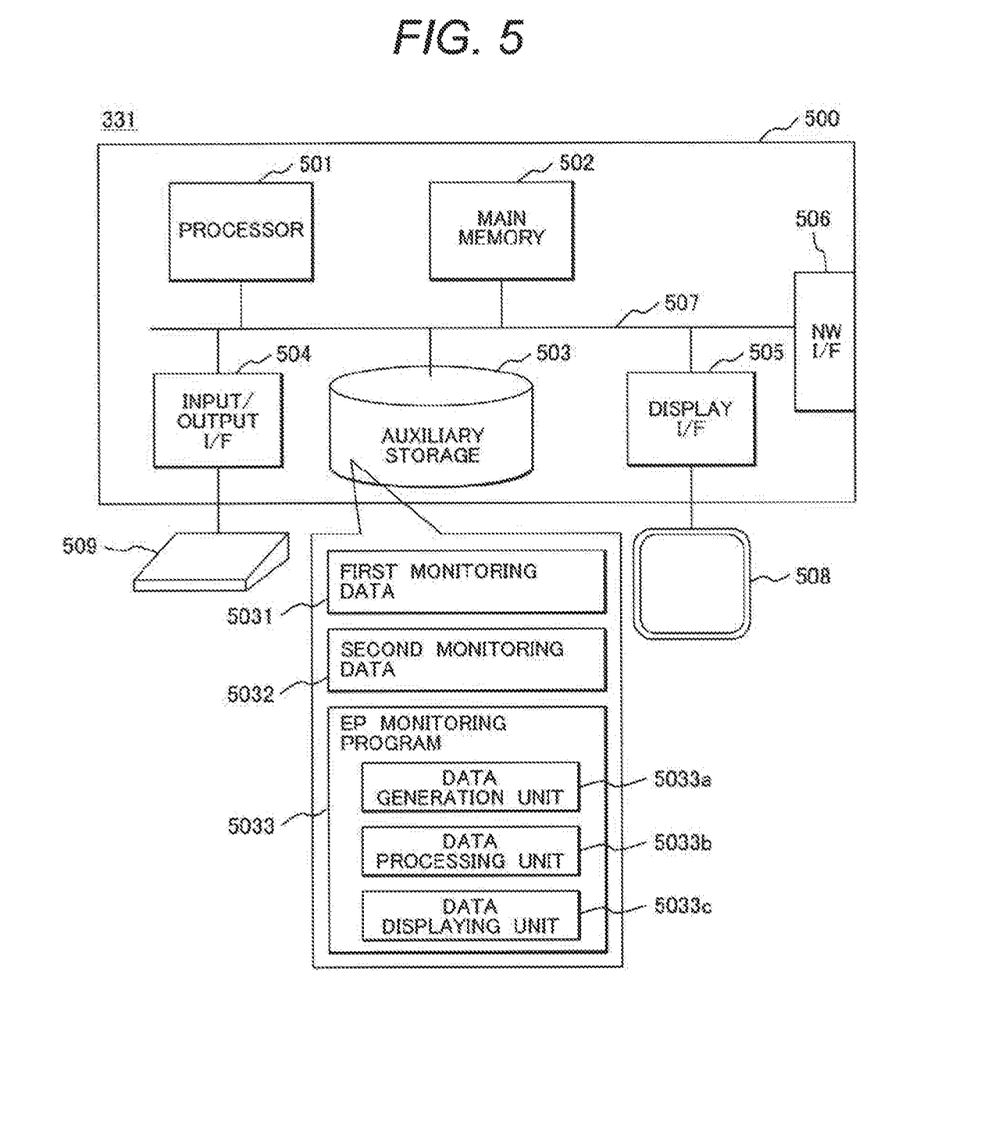
FIG. 5 is a configuration example of the equipment state monitoring device.

FIG. 5 illustrates a hardware configuration example of a calculator 500 that achieves the equipment state monitoring device 331. The calculator 500 includes a processor 501, a main memory 502, an auxiliary storage 503, an input/output interface 504, a display interface 505, and a network interface 506, and these are connected by a bus 507. The input/output interface 504 is connected to an input device 509, such as a keyboard and a mouse, and the display interface 505 is connected to a display 508 to achieve a GUI. The network interface 506 is an interface for connecting the monitoring device 321 and the central control device 322. The auxiliary storage 503 typically includes a non-volatile memory, such as an HDD and a flash memory, and stores a program executed by the calculator 500, data to be processed by the program, and the like. The main memory 502 includes a RAM, and from the instruction of the processor 501, temporarily stores the program, data necessary for executing the program, and the like. The processor 501 executes the program loaded from the auxiliary storage 503 to the main memory 502.

The auxiliary storage 503 stores first monitoring data 5031 including environment data, the equipment operating value, and the sensor measurement value transmitted from the central operation room to the equipment state monitoring device 331, second monitoring data 5032 acquired by processing the first monitoring data 5031 for carrying out determination of the optimal operating value of the plant equipment piece (here, the electrostatic precipitator), and an electrostatic precipitator (EP: Electrostatic Precipitator) monitoring program 5033 for monitoring the operating state of the electrostatic precipitator.

Since as described above, the equipment state monitoring device 331 does not require the real time properties, the first monitoring data is transmitted from the central operation room by the batch process at a frequency of, for example, once a day, and is stored in the auxiliary storage 503. The first monitoring data 5031 includes, in addition to the sensor measurement value (the monitoring data 410 illustrated in FIG. 4), the set operating value of the electrostatic precipitator acquired from the central control device 322 (the dust brushing-off operation, the electric charging method, and the electric power consumption that have been described above), and the environment data that affects the performance of the electrostatic precipitator, such as the type of coal in the case of using the coal as the fossil fuel.

Figure 6:
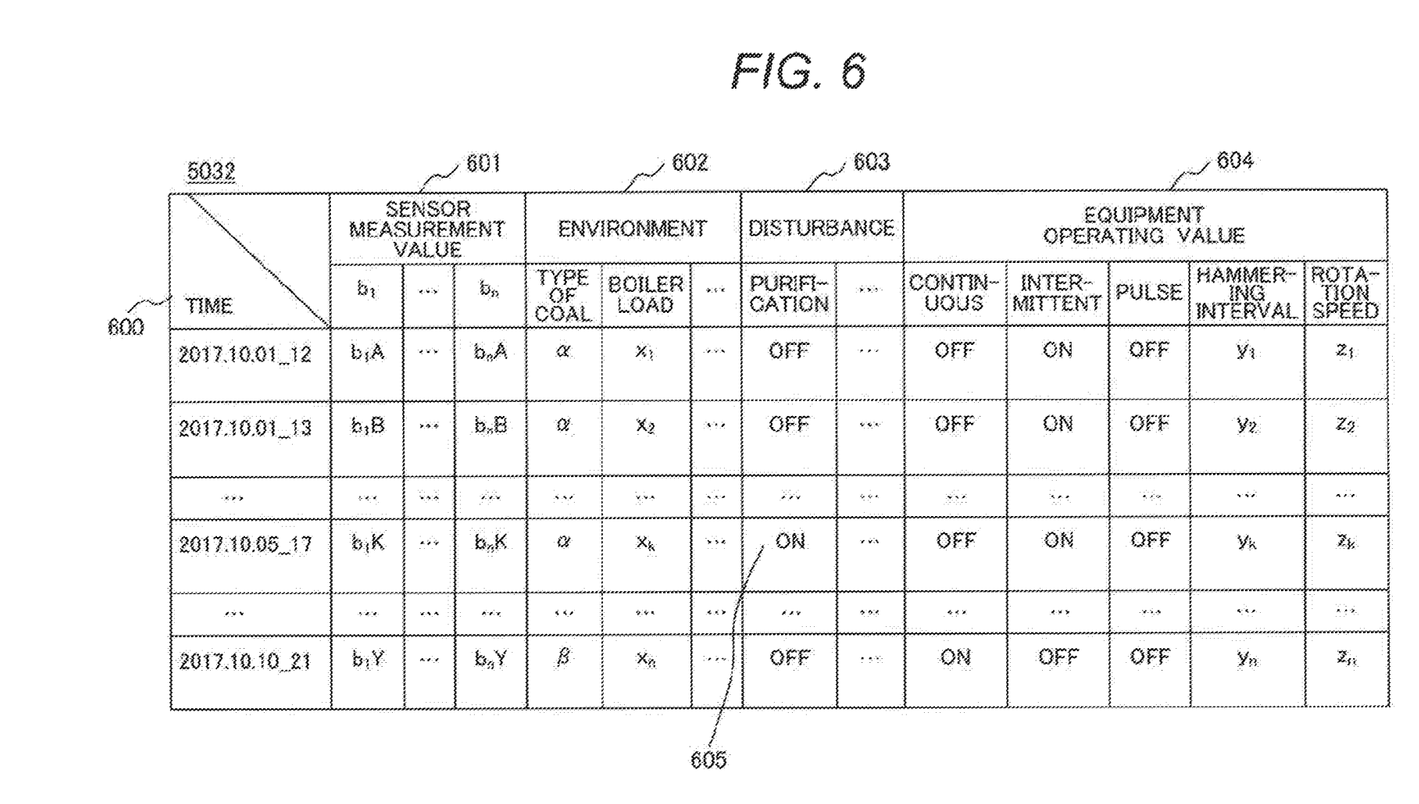
FIG. 6 is an example of monitoring data used in the equipment state monitoring device.

A data generation unit 5033a of the EP monitoring program 5033 processes the first monitoring data 5031 to generate the second monitoring data 5032. FIG. 6 illustrates an example of the second monitoring data 5032. Along a time axis 600, the second monitoring data 5032 includes a sensor measurement value 601, environment data 602, disturbance data 603, and an equipment operating value 604. The time axis 600 is configured of a prescribed time width (for example, in a unit of one hour). When the sensor measurement value monitored for the operation in the central operation room is the dust concentration of the outlet of the electrostatic precipitator, the information that systematically affects that value is selected as the environment data 602. For this, there can be the information inputted by the operator and the information acquired from the sensor measurement values of other plant equipment pieces. When the coal is used as the fossil fuel, the properties of the coal used affect the properties of the exhaust gas. The type of the coal used is inputted by the operator. Also, the load of the boiler affects the amount of the exhaust gas. This can be acquired from the sensor measurement value of the main equipment piece. The disturbance 603 is information for determining whether or not the temporary change in the sensor measurement value is due to the disturbance. For example, when the waveform 404 illustrated in FIG. 4 is the dust concentration of the outlet of the electrostatic precipitator, the disturbance 603 is information for determining whether or not the waveform 405 is due to the disturbance. The determination is enabled by estimating the disturbance that can be caused, from the operation and the like of the environmental conservation apparatus. For example, the temporary rising of the dust concentration like the waveform 405 can be caused when dust purification is performed in the upstream of the electrostatic precipitator. Specifically, when the soot blowing is performed in an air preheater 112 (see FIG. 1), the exhaust gas containing much dust temporarily flows into the electrostatic precipitator 113, and the dust concentration of the outlet of the electrostatic precipitator temporarily rises. Since such the change due to the disturbance may be neglected from the viewpoint of the determination of the optimal operating value of the equipment piece, disturbance occurrence 605 is determined from the sensor measurement value or the equipment operating value of the process equipment piece (in this case, the air preheater 112). The data generation unit 5033a performs the data processing for the first monitoring data 5031 (determination of the disturbance event occurrence, the averaging of the sensor measurement values, and the like) according to its data generation algorithm, thereby acquiring the second monitoring data 5032.

A data processing unit 5033b performs the analysis of the operating state of the electrostatic precipitator on the basis of the second monitoring data 5032. As illustrated in FIG. 6, the sensor measurement value 601, the environment data 602, the disturbance 603, and the equipment operating value 604 for the electrostatic precipitator are linked to the time axis 600 and are stored, so that the second monitoring data 5032 can be filtered depending on the environment, the presence or absence of the disturbance, and the equipment control state. For example, the data in which the purification of the disturbance 603 is ON is filtered, so that the operating state of the electrostatic precipitator can be analyzed by using only the sensor measurement value during the period in which the purification is not performed in the upstream of the electrostatic precipitator.

The data processing unit 5033b, not only monitors each of the prescribed data (the sensor measurement value, the parameter, and the like), but also performs the data processing so that the mutual relationship between a plurality of data is monitored. For example, the data processing unit 5033b generates a two-axis graph by using, as axes, two data pieces, and displays the generated two-axis graph on the display 508 by a data displaying unit 5033c. Hereinafter, examples thereof are illustrated in FIGS. 7 to 10.

Figure 7:
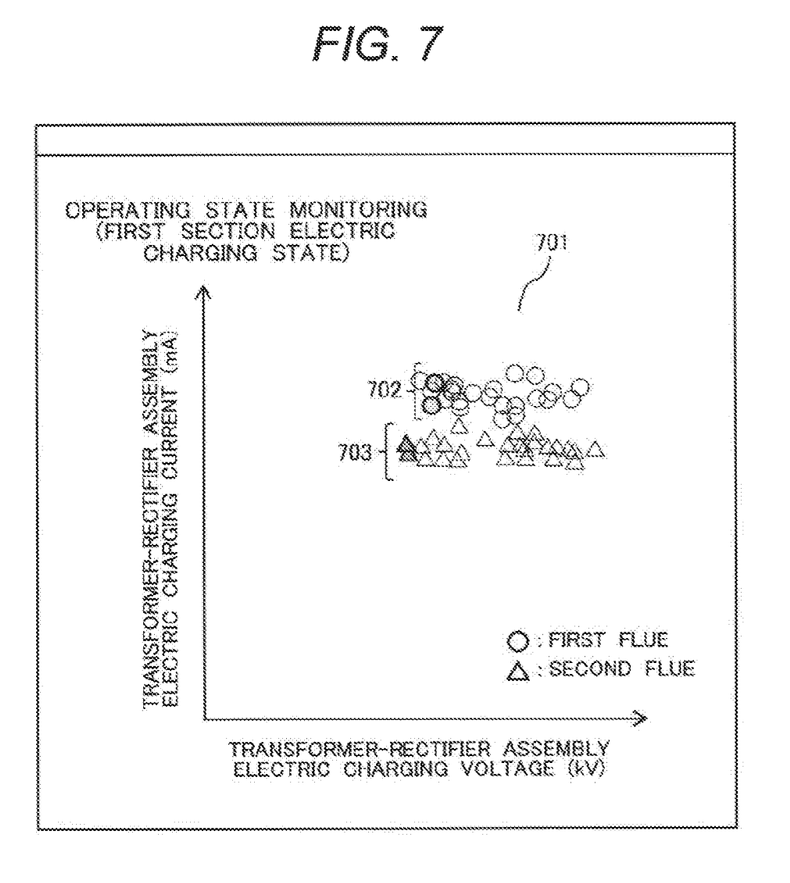
FIG. 7 is an example of a two-axis graph generated by a data processing unit.

FIG. 7 is a two-axis graph 701 illustrating the electric charging state in the certain dust collection section (here, the first section) of the electrostatic precipitator. The electric charging to the electrostatic precipitator is performed by a transformer-rectifier assembly provided in each section. The transformer-rectifier assembly is a device that converts a low voltage power source to supply the electric charging voltage and the electric charging current to the electrode. The two-axis graph 701 is a graph in which the electric charging voltage of the transformer-rectifier assembly is taken on the horizontal axis, and the electric charging current of the transformer-rectifier assembly is taken on the vertical axis. When as described in FIG. 2A, the electrostatic precipitator has the plurality of flues, a plurality of transformer-rectifier assemblies are provided, and each of the transformer-rectifier assemblies supplies the electric charging current and the electric charging voltage to the electrode of each of the flues. To discriminate that, a plot mark different for each of the transformer-rectifier assemblies is used in the two-axis graph 701. Also, to visibly identify plot marks 702 and 703 of the latest data, they are displayed to be discriminated from other data.

The data processing unit 5033b can filter the time width displayed in the two-axis graph 701. Also, in addition to the time filtering, a filtering based on the environment data of the second monitoring data 5032, for example, the type of the coal or the boiler load that is sectioned into some load widths for filtering, is applicable, so that the presence or absence of the change in the operating state under the equivalent or similar condition is easily checked.

Figure 8:
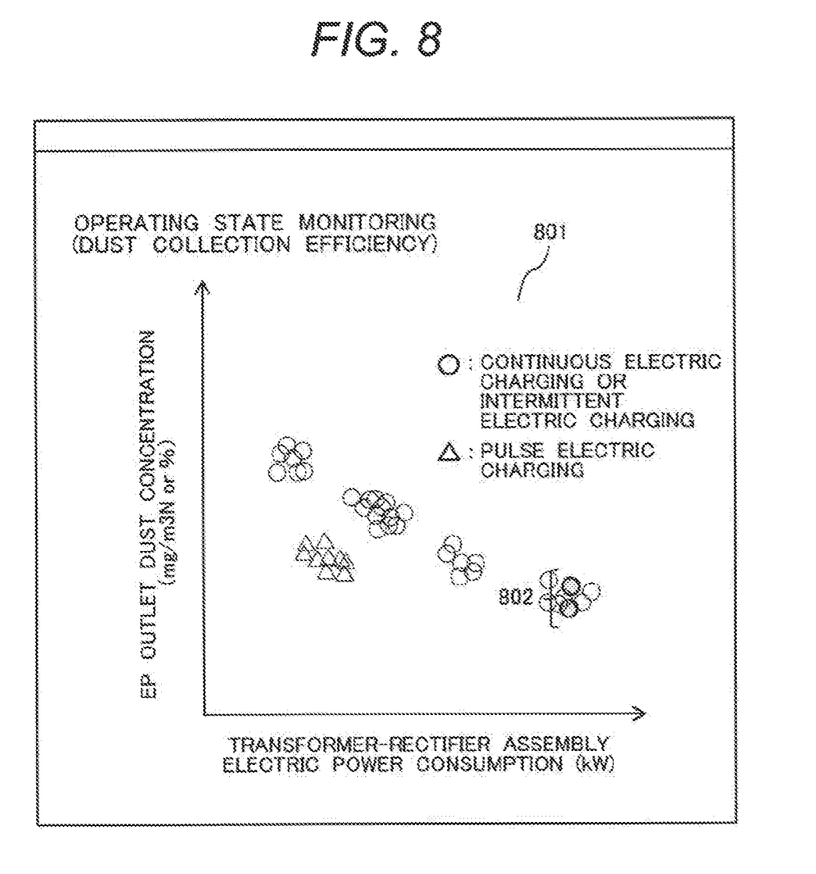
FIG. 8 is an example of a two-axis graph generated by the data processing unit.

FIG. 8 is a two-axis graph 801 illustrating the dust collection performance of the electrostatic precipitator and the electric power consumption of the transformer-rectifier assembly. The two-axis graph 801 is a graph in which the electric power consumption of the transformer-rectifier assembly is taken on the horizontal axis, and the dust concentration of the outlet of the electrostatic precipitator is taken on the vertical axis. The relationship between the electric power consumption of the transformer-rectifier assembly and the dust concentration is taken, so that the dust collection efficiency of the electrostatic precipitator can be analyzed. As described previously, there are the plurality of types of electric charging methods. For this, a different plot mark is used for each of the electric charging methods (the continuous electric charging, the intermittent electric charging, or the pulse electric charging). Also, in order that a plot mark 802 of the latest data is easily visibly identified, it is displayed to be discriminated from other data. Like FIG. 7, the data processing unit 5033b can filter the time displayed in the two-axis graph 801.

Figure 9:
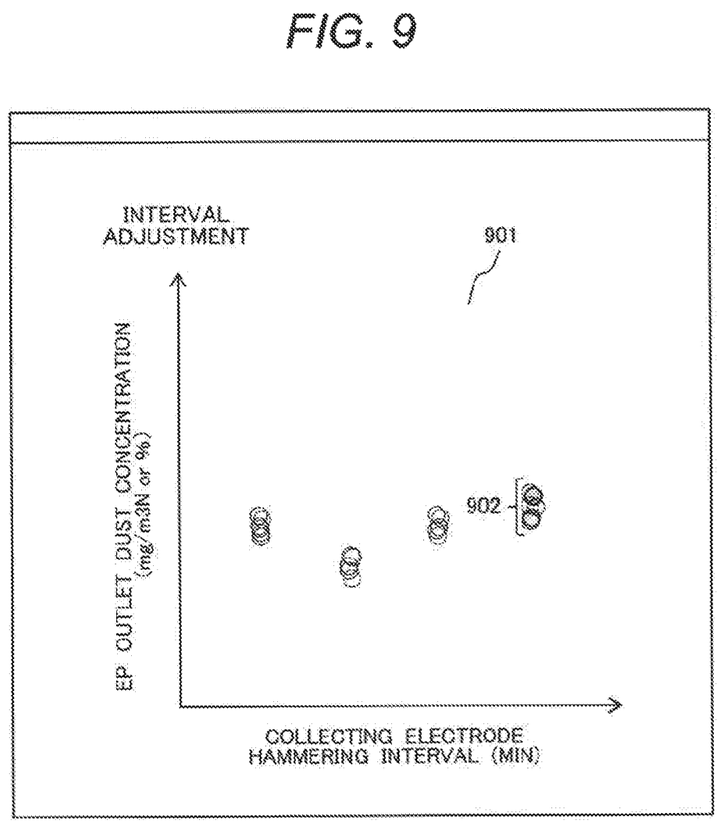
FIG. 9 is an example of a two-axis graph generated by the data processing unit.
Figure 10:
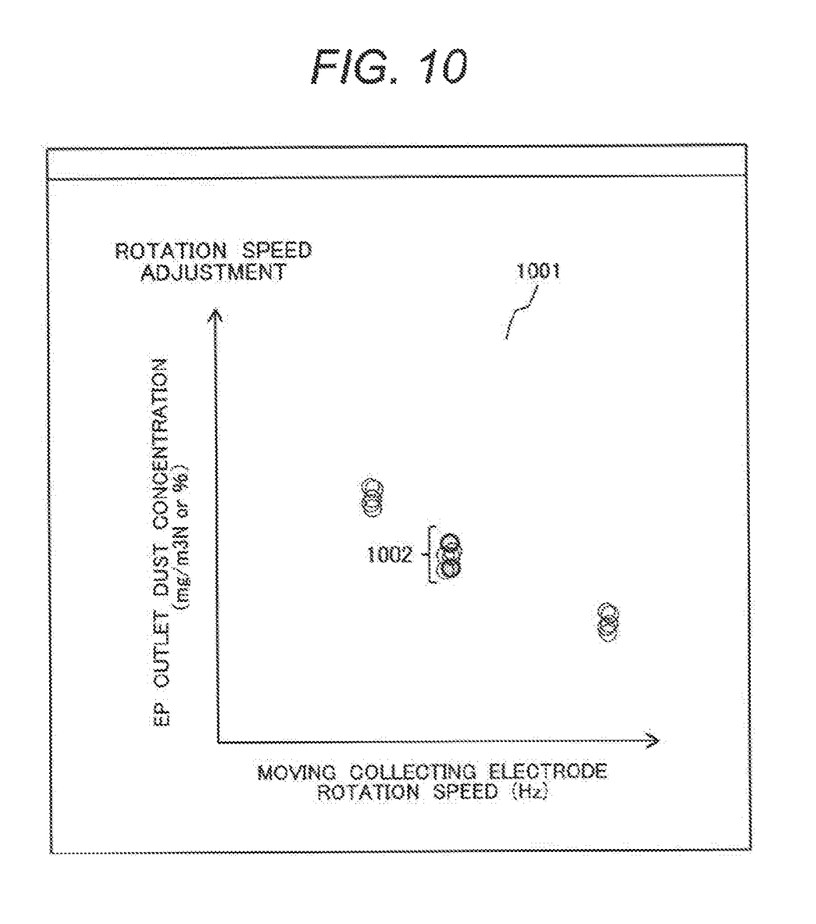
FIG. 10 is an example of a two-axis graph generated by the data processing unit.

FIG. 9 is a two-axis graph 901 illustrating the relationship between the equipment operating value and the dust concentration, and FIG. 10 is a two-axis graph 1001 illustrating the relationship between the equipment operating value and the dust concentration. When the electrostatic precipitator is the fixed electrode type device, the collecting electrode hammering interval is used as the equipment operating value and is graphed, as illustrated in FIG. 9, and when the electrostatic precipitator is the moving electrode type device, the rotation speed of the moving collecting electrode is used as the equipment operating value and is graphed, as illustrated in FIG. 10. With this, the analysis whether or not the dust brushing-off frequency is appropriately held from the relationship with the dust concentration of the outlet of the electrostatic precipitator is enabled. In order that plot marks 902 and 1002 of the latest data are easily visibly identified also in these graphs, they are displayed to be discriminated from other data, and like FIG. 7, the data processing unit 5033b can filter the time width displayed in the two-axis graphs 901 and 1001.

In light of these analyses, the optimal configuration value for the equipment operating value can be determined. For example, when the dust concentration of the outlet of the electrostatic precipitator can be considered to be constantly sufficiently low, the hammering interval is extended or the moving speed of the moving collecting electrode is lowered, so that the progress of the deterioration of the facility can be slowed. Likewise, the optimal configuration value for the equipment operating value can be determined for each environment condition.

Example 2

Figure 11:
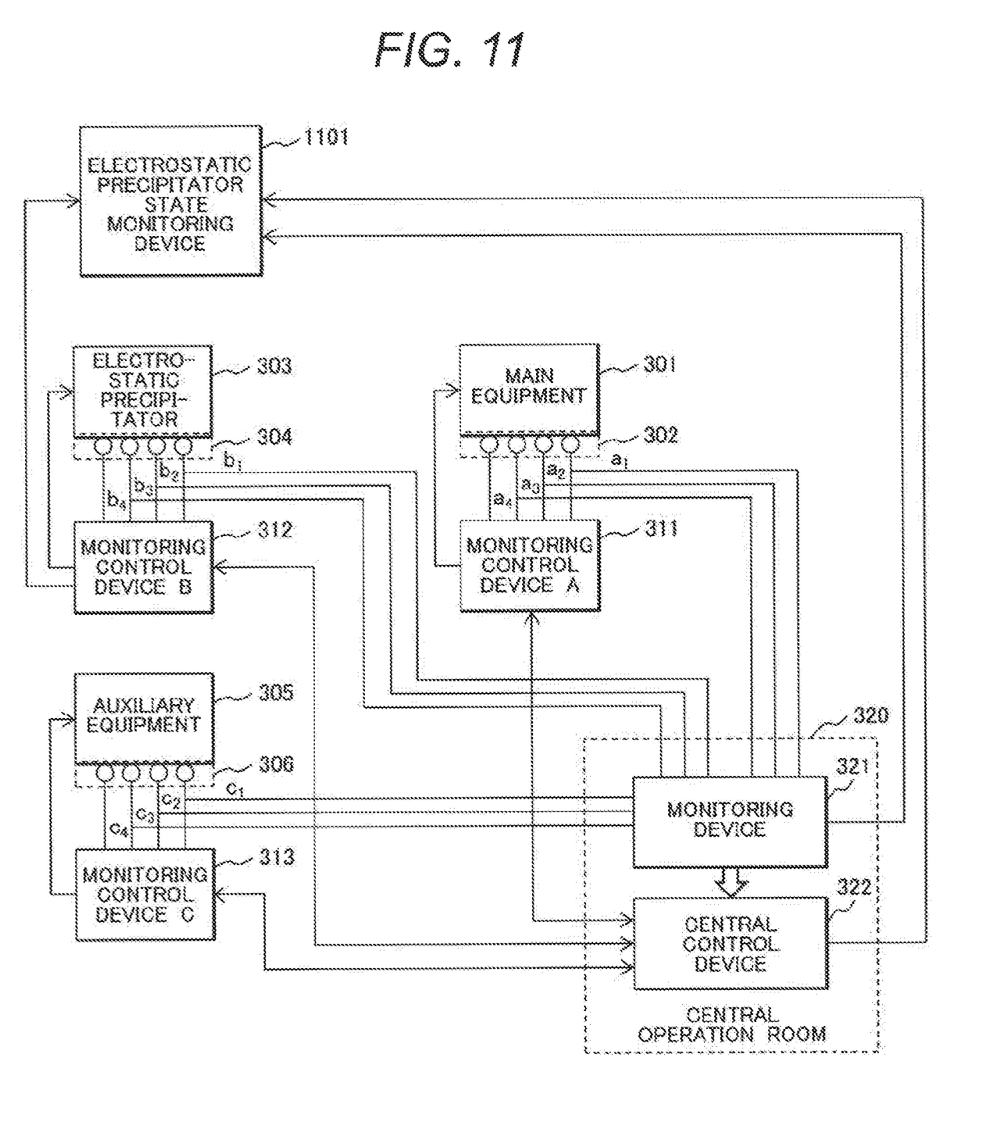
FIG. 11 is another configuration example of the plant equipment monitoring control system.

FIG. 11 illustrates the plant equipment monitoring control system according to Example 2. A state monitoring device according to Example 2 is provided corresponding to each plant equipment piece. In FIG. 11, an electrostatic precipitator state monitoring device 1101 is provided to the electrostatic precipitator. The electrostatic precipitator state monitoring device 1101 acquires the sensor measurement value received by the monitoring control device 312 for the measurement value of the sensor 304 provided on the electrostatic precipitator 303. All the measurement values of the equipment pieces provided in the plant equipment piece are not always collected to the central operation room. Thus, by acquiring the sensor measurement values collected by the monitoring control device 312, all the sensor measurement values measured to the plant equipment piece can be acquired (in the example of FIG. 11, a sensor measurement value $b_4$ can be newly acquired as compared with Example 1). Thus, the more detailed information about the plant equipment piece can be acquired as compared with the system of Example 1.

The electrostatic precipitator state monitoring device 1101 can acquire, from the monitoring control device 312, the sensor measurement value and the equipment operating value related to the electrostatic precipitator 303. On the other hand, the environment data of the plant and the sensor measurement values and the equipment operating values related to other plant equipment pieces are required to be acquired from the monitoring device 321 and the central control device 322. With this, the same analysis as Example 1 can be executed in more detail by using a larger number of types of sensor measurement values. In this case, a time shift occurs between the sensor measurement value related to the electrostatic precipitator 303 received by the monitoring device 321 and the sensor measurement value received by the monitoring control device 312. For this, the sensor measurement value data from the monitoring device 321 may include the sensor measurement value data from the electrostatic precipitator, and take the matching between the measurement value data to correct the time. Alternatively, when the error of the time is within a certain degree of range, in particular, the time may be unrequired to be corrected.

REFERENCE SIGNS LIST

100 . . . main equipment device group,
101 . . . boiler,
102 . . . turbine,
103 . . . electric generator,
104 . . . condenser
110 . . . environmental conservation apparatus,
111 . . . denitrification device,
112 . . . air preheater,
113, 303 . . . electrostatic precipitator,
114 . . . desulfurization device,
115 . . . funnel,
116 . . . heat exchanger,
201, 202 . . . flue,
203 to 205 . . . dust collection section,
206 . . . hopper,
211 . . . discharge electrode,
212 . . . collecting electrode,
213 . . . ion,
301 . . . main equipment piece,
305 . . . auxiliary equipment piece,
302, 304, 306 . . . sensor,
311, 312, 313 . . . monitoring control device,
320 . . . central operation room,
321 . . . monitoring device,
322 . . . central control device,
331 . . . equipment state monitoring device,
501 . . . processor,
502 . . . main memory,
503 . . . auxiliary storage,
504 . . . input/output interface,
505 . . . display interface,
506 . . . network interface,
507 . . . bus,
508 . . . display,
509 . . . input device,
1101 . . . electrostatic precipitator state monitoring device.

The invention claimed is:

1. A plant equipment monitoring control system comprising:
a plurality of plant equipment pieces including a first plant equipment piece;
a plurality of monitoring control devices provided corresponding to the respective plurality of plant equipment pieces;
a plurality of sensors provided on the plurality of plant equipment pieces;
a monitoring device that collects sensor measurement values from the plurality of sensors of the plurality of plant equipment pieces;
a central control device that continuously monitors each of the sensor measurement values collected to the monitoring device, and instructs an operating value in real time according to the sensor measurement value to the monitoring control device corresponding to each of the plant equipment pieces; and
an equipment state monitoring device that receives first monitoring data including the sensor measurement value and the operating value from the monitoring device and the central control device, analyzes an operating state of the first plant equipment piece during a prescribed period, and carries out determination of an optimal operating value of the first plant equipment piece depending on a result of the analysis of the operating state of the first plant equipment piece;
wherein the equipment state monitoring device analyzes the operating state of the first plant equipment piece on the basis of second monitoring data during the prescribed period generated by processing the first monitoring data received from the monitoring device and the central control device; and
wherein in the second monitoring data, the sensor measurement values are averaged during a prescribed time, environment data that systematically affects the sensor measurement value, disturbance data that temporarily affects the sensor measurement value, and the operating value of the first plant equipment piece are linked to a time axis and are stored.

2. The plant equipment monitoring control system according to claim 1,
wherein the equipment state monitoring device filters second monitoring data on the basis of a time width, the environment data, the disturbance data, and the operating value of the first plant equipment piece, and analyzes the operating state of the first plant equipment piece.

3. The plant equipment monitoring control system according to claim 1,
wherein the equipment state monitoring device creates a two-axis graph by using, as axes, respective two data pieces included in second monitoring data.

4. The plant equipment monitoring control system according to claim 1, wherein the first plant equipment piece is an electrostatic precipitator of a thermal power plant, and
wherein as a monitoring operating value of the electrostatic precipitator, at least one of an operation of brushing off dust in the electrostatic precipitator, a method for electrically charging an electrode of the electrostatic precipitator, and the electric power consumption of an electric charging device that applies a voltage to the electrode is included.

5. The plant equipment monitoring control system according to claim 1, wherein the first plant equipment piece is an electrostatic precipitator of a thermal power plant,
wherein as the environment data, a type of coal used for a boiler of the thermal power plant and a boiler load of the boiler are included,
wherein as the disturbance data, the execution of dust purification in an upstream of the electrostatic precipitator is included.

6. The plant equipment monitoring control system according to claim 1,
wherein the plurality of sensors provided on the first plant equipment piece include a sensor in which while being received by a first monitoring control device provided corresponding to the first plant equipment piece, the sensor measurement value of the sensor is not collected to the monitoring device, and
wherein the equipment state monitoring device receives the sensor measurement value received by the first monitoring control device, and analyzes the operating state of the first plant equipment piece on the basis of the sensor measurement value received by the first monitoring control device and second monitoring data during the prescribed period generated by processing the first monitoring data.

7. A plant equipment monitoring control method in which a plurality of sensors are provided on a plurality of plant equipment pieces including a first plant equipment piece, and the plurality of plant equipment pieces are controlled on the basis of sensor measurement values from the plurality of sensors, wherein a monitoring device collects the sensor measurement values from the plurality of sensors, wherein a central control device continuously monitors each of the sensor measurement values collected to the monitoring device, and instructs an operating value in real time according to the sensor measurement value to a monitoring control device of each of the plant equipment pieces, and wherein an equipment state monitoring device analyzes an operating state of the first plant equipment piece during a prescribed period on the basis of first monitoring data including the sensor measurement value and the operating value, and carries out determination of an optimal operating value of the first plant equipment piece depending on a result of the analysis of the operating state of the first plant equipment piece;

wherein the equipment state monitoring device analyzes the operating state of the first plant equipment piece on the basis of second monitoring data during the prescribed period generated by processing the first monitoring data received from the monitoring device and the central control device; and wherein in the second monitoring data, the sensor measurement values are average during a prescribed time, environment data that systematically affects the sensor measurement value, disturbance data that temporarily affects the sensor measurement value, and the operating value of the first plant equipment piece are linked to a time axis and are stored.

8. The plant equipment monitoring control method according to claim 7, wherein the equipment state monitoring device filters second monitoring data on the basis of a time width, the environment data, the disturbance data, and the operating value of the first plant equipment piece, and analyzes the operating state of the first plant equipment piece.

9. The plant equipment monitoring control method according to claim 7, wherein the equipment state monitoring device creates a two-axis graph by using, as axes, respective two data pieces included in second monitoring data.

10. The plant equipment monitoring control method according to claim 7, wherein the first plant equipment piece is an electrostatic precipitator of a thermal power plant, wherein as the monitoring operating value of the electrostatic precipitator, at least one of an operation of brushing off dust in the electrostatic precipitator, a method for electrically charging an electrode of the electrostatic precipitator, and the electric power consumption of an electric charging device that applies a voltage to the electrode is included.

11. The plant equipment monitoring control method according to claim 7, wherein the first plant equipment piece is an electrostatic precipitator of a thermal power plant, wherein as the environment data, a type of coal used for a boiler of the thermal power plant and a boiler load of the boiler are included, and wherein as the disturbance data, the execution of dust purification in an upstream of the electrostatic precipitator is included.

\* \* \* \* \*